United States Patent [19]

Forschner et al.

[11] Patent Number: 5,264,133

[45] Date of Patent: Nov. 23, 1993

[54] REMOVAL OF SELENIUM FROM AQUEOUS MEDIA

[75] Inventors: Thomas C. Forschner; Peter A. Kilty; Thomas F. Brownscombe, all of Houston, Tex.

[73] Assignee: Shell Oil Company, Houston, Tex.

[21] Appl. No.: 957,832

[22] Filed: Oct. 8, 1992

[51] Int. Cl.$^5$ ............................................. C02F 1/28
[52] U.S. Cl. ..................... 210/670; 210/679; 210/684; 210/688; 210/912
[58] Field of Search ............... 210/681, 682, 688, 679, 210/912, 670, 684

[56] References Cited

U.S. PATENT DOCUMENTS

| | | | |
|---|---|---|---|
| 3,196,106 | 7/1965 | Haden et al. | 210/682 |
| 3,763,049 | 10/1973 | Gerber | 423/DIG. 4 |
| 4,038,376 | 7/1977 | McCoy et al. | 423/510 |
| 4,055,630 | 10/1977 | McCoy et al. | 423/510 |
| 4,096,064 | 6/1978 | du Fresne | 210/913 |
| 4,212,771 | 7/1980 | Hamner | 502/64 |
| 4,405,464 | 9/1983 | Baldwin et al. | |
| 4,557,858 | 12/1985 | Galloway | 429/103 |
| 4,578,195 | 3/1986 | Moore et al. | 210/751 |
| 4,725,357 | 2/1988 | Downing et al. | 210/611 |
| 4,790,945 | 12/1988 | Baker | 55/72 |
| 4,792,045 | 12/1988 | Baker | 55/72 |
| 4,806,264 | 2/1989 | Murphy | |
| 4,915,928 | 4/1990 | Marcantonio | |
| 4,935,146 | 6/1990 | O'Neill et al. | |
| 4,971,702 | 11/1990 | Renk | 210/912 |

FOREIGN PATENT DOCUMENTS 48-30558 9/1973 Japan.
833571 5/1981 U.S.S.R.

OTHER PUBLICATIONS

R. R. Trussell et al., *Selenium Removal from Groundwater Using Activated Alumina*, EPA-600/2-80-153, US EPA, Cincinnati, Aug. 1980.

J. V. Boegel and D. A. Clifford, *Selenium Oxidation and Removal by Ion Exchange*. PB 86-171 428 AS, NTIS, Springfield, Virginia, 1986.

*Water Quality and Treatment: A Handbook of Community Water Supplies*, p. 624.

*Metals and Their Compounds in the Environment*, Edited by Ernest Merian, ISBN 3-527-26521-X, 2nd. Rev. Ed. 1991. (VCH, New York).

Thomas J. Sorg and Gary S. Logsdon, *Removal of Selenium From Water—State of the Art*, EPA, Cincinnati, Ohio pp. 114-128.

*Chemical Process for Removing Selenium from Water*, PB91-155382, Nov. 9, 1990, U.S. Dept. of the Interior, Washington, D.C., U.S. Dept. of Commerce, NTIS.

*Primary Examiner*—Stanley S. Silverman
*Assistant Examiner*—Cynthia L. Nessler

[57] ABSTRACT

A process for the removal of soluble selenium from aqueous media comprising contacting the aqueous media with a porous support material having exchanged thereon metal ions selected from transition metal ions, alkali earth metal ions and mixtures thereof.

21 Claims, No Drawings

REMOVAL OF SELENIUM FROM AQUEOUS MEDIA

BACKGROUND OF THE INVENTION

1. Field of the Invention

The present invention relates to a process for the removal of selenium from aqueous media.

2. Description of the Prior Art

Selenium is a naturally occurring group VIA element found in rocks and soil with the average concentration in the earth's crust being about 0.7 ppm. Small amounts of selenium are commonly found in air, water, plants, crops and fossil fuels. It exists in several oxidation states, including selenide ($-2$), elemental selenium (0), selenite ($+4$), or selenate ($+6$). While all of these oxidation states can be found in nature, selenite and selenate are the more common soluble forms found in water systems.

Processes such as petroleum refining and agricultural irrigation often result in wastewaters with concentrations of selenium which are too high to be released into public waters due to safety concerns. While trace amounts of selenium are necessary for life, and in some instances have been found useful for the treatment of various diseases, concentrations of soluble selenium greater than those necessary to sustain life or provide treatment of diseases are potentially harmful to humans, birds, livestock and agriculture. Concerns over the toxic effects of selenium have prompted an increasing need to efficiently remove selenium from industrial media before the wastewaters are reintroduced into the environment. Currently, only a limited number of methods for removal are available.

Prior wastewater treatment techniques have been used to remove relatively small levels of selenium. These techniques have included lime precipitation, reverse osmosis techniques and various adsorption techniques such as iron and aluminum hydroxide adsorption/coprecipitation and activated carbon adsorption.

Of these techniques, the use of lime precipitation has not achieved adequate technical success and reverse osmosis has proven to be very costly for the treatment of large volumes of media. The efficiency of selenium removal using the various adsorption techniques is partially dependant upon the form or oxidation state of the selenium present, as well as the competitive ions in the media. These mixed forms or oxidation states of selenium can potentially hamper removal within a single treatment method. Because most waters include a mixture of selenium species, it has been difficult to approach complete removal using only one step. The result has been the need to convert the selenium present into the same or substantially similar forms prior to attempting removal or to treat the waste stream where the selenium is found in a chemically similar form. These multiple step methods are often costly and have proven difficult to implement.

U.S. Pat. No. 4,405,464, issued Sep. 20, 1983, discloses a process for reducing selenium in the Se(VI) oxidation state by mixing the aqueous solution with a quantity of metallic iron. The iron then reduces the selenium and is collected by precipitation.

U.S. Pat. No. 4,806,264, issued Feb. 21, 1989, discloses a process for removing selenium ions from an aqueous solution by reducing the selenium ions with an amount of ferrous ions to elemental selenium.

Still another method, disclosed in U.S. Pat. No. 4,915,928, issued Apr. 10, 1990, involves removing selenium from wastewaters using strong-base anion exchange resins. This process works only after sulfur, which is often present in higher concentrations than the selenium, has been stripped from the wastewaters.

"Chemical Process for Removing Selenium From Water," U.S. patent application PB91-155382, filed by the Department of the Interior Nov. 9, 1990 and available through the National Technical Information Service, discloses a process for the removal of organoselenium compounds and selenate using a combination of a transition metal and an electropositive metal.

A process has now been discovered in which selenium in its various oxidation forms may be removed from aqueous media by utilizing a porous support having metal ions selected from the group consisting of transition metal ions, alkaline earth metal ions and mixtures thereof either complexed or exchanged thereon. One advantage of this process is that it provides an environmentally compatible means to dispose of or recover complexed or bound selenium, especially with regard to the removal of selenium from sour water produced by petroleum refining.

SUMMARY OF THE INVENTION

The present invention relates to a process for the removal of selenium in its various oxidation states from aqueous media by contacting the aqueous media with a porous support material having exchanged thereon one or more metal ions selected from the group consisting of transition metal ions, alkaline earth metal ions and mixtures thereof that interact with the selenium contaminate. The present invention is not concerned with necessarily removing all of the selenium present in aqueous media, but rather is concerned with decreasing the amount of selenium present in order to bring these levels in compliance with environmentally acceptable standards.

DESCRIPTION OF THE PREFERRED EMBODIMENTS

In the present invention, an aqueous media containing soluble selenium is contacted with a porous support having exchanged thereon metal ions selected from the group consisting of transition metal ions, alkaline earth metal ions and mixtures thereof.

The support used in the current process is an ion exchanged porous support. The term "ion exchanged" as used herein refers not only to the traditional meaning of ion exchange, which is an adsorption operation in which there is a reversible chemical reaction between a solid and ions within a fluid when the fluid is passed through a bed of the solid and certain ions from the fluid are exchanged with ions from the solid, but also encompasses the case where an ion is bound to the structure by Van der Waals forces, covalent and/or ionic bonds. The key aspect of the invention is that the ion in question is securely attached to the external and internal pore surfaces of the support and will not easily be "dissolved" off, for instance by contact with pure water at a pH of 7.0. It can of course be removed under suitable ion exchange conditions, such as contact with an aqueous solution containing high concentrations of competing ions. Examples of suitable support materials include, for example, alumina, silica, alumina-silica, crystalline aluminophosphates, cation exchangeable resins, zeolites and mixtures thereof.

Aluminas are suitable support materials due to their high degree of porosity, ability to maintain high surface areas and density characteristics. In addition, aluminas often provide supports with low shrinkage, high attrition resistance and high crush strength. Preferably, a gamma alumina with a pore volume from about 0.1 ml/g to about 1.2 ml/g, even more preferably from about 0.5 ml/g to about 0.8 ml/g, is used. The surface area is from about 5 $m^2/g$ to about 750 $m^2/g$, preferably from about 100 $m^2/g$ to about 550 $m^2/g$.

Silicas also provide suitable support materials because of their high surface area and degree of porosity. A suitable pore volume for silicas is from about 0.1 ml/g to about 1.3 ml/g, preferably from about 0.5 ml/g to about 0.9 ml/g. The surface area is from about 5 $m^2/g$ to about 650 $m^2/g$, preferably from about 70 $m^2/g$ to about 450 $m^2/g$.

Alumina-silicas are suitable since they too have many of the same characteristics found in alumina and silica such as high surface area and degree of porosity. They also prove to be very stable.

Crystalline aluminophosphates are well-known materials which also provide promising results as support materials. Classes of these materials comprise compositions crystallized in the $AlPO_4$, $SAPO_4$ (siliconaluminophosphate), $MeAPO_4$ (metalloaluminophosphate) and $ElAPO_4$ (non-metal substituted aluminophosphate) families.

Cation exchangeable resins can also be used as support materials. These resins, which are based primarily on acrylic acid or methacrylic acid that has been cross-linked with a difunctional monomer such as divinyl benzene or pentacrythratol triacrylate, provide the advantage of being easily regenerated with strong acids.

In the preferred embodiment of the present invention, the porous support is a zeolite. Essentially any crystalline zeolitic aluminosilicate can be employed to remove selenium in the instant process. The zeolites can include both synthetic and naturally occurring zeolites. Illustrative of the synthetic zeolites and descriptions thereof are Zeolite X, U.S. Pat. Nos. 2,882,244; Zeolite Y, 3,130,007; Zeolite A, 2,882,243; Zeolite L, Bel. 575,117; Zeolite D, Can. 611,981; Zeolite R, 3,030,181; Zeolite S, 3,054,657; Zeolite T, 2,950,952; Zeolite Z, Can. 614,995; Zeolite E, Can. 636,931; Zeolite F, 2,995,358; Zeolite O, 3,140,252; Zeolite W, 3,008,803; Xeolite Q, 2,991,151; Zeolite M, 2,995,423; Zeolite H 3,010,789; Zeolite J, 3,001,869; Zeolite W, 3,012,853; Zeolite KG, 3,056,654; Zeolite SL, Dutch 6,710,729; Zeolite Omega, Can. 817,915; Zeolite ZK-5, 3,247,195; Zeolite Beta, 3,308,069; EU-1, 4,537,754; Zeolite ZK-4, 3,314,752; Zeolite ZSM-5, 3,702,886; Zeolite ZSM-11, 3,709,979; Zeolite ZSM-12, 3,832,449; Zeolite ZSM-20, 3,972,983; Zeolite ZSM-35, 4,016,245; Zeolite ZSM-50, 4,640,829; synthetic mordenite; the so-called ultrastable zeolites of U.S. Pat. Nos. 3,293,192 and 3,449,070; and the references cited therein, incorporated herein by reference. Other synthetic zeolites are described in the book "Zeolite Molecular Sieves-Structure, Chemistry and Use," by Donald W. Breck, 1974, John Wiley & Sons, incorporated herein by reference. Illustrative of the naturally occurring crystalline zeolites are analcime, bikitaite, edingtonite, epistilbite, levynite, dachiardite, erionite, faujasite, analcite, paulingite, noselite, ferrierite, heulandite, scolecite, stilbite, clinotilolite, harmotone, phillipsite, brewsterite, flakite, datolite, chabazite, gmelinite, cancrinite, leucite, lazurite, scolecite, mesolite, ptilolite, mordenite, nepheline, natrolite, scapolite, thomsonite, gismondine, garronite, gonnardite, heulandite, laumontite, levynite, offretite, yugawaralite. Descriptions of certain naturally occurring zeolites are found in the aforementioned book by Breck and in the book "Molecular Sieves-Principles of Synthesis and Identification," by R. Szostak, Van Nostrand Renhold, New York, 1989, both incorporated herein by reference, and in other references. These zeolites may be in the hydrogen form or may be partially or fully exchanged with ammonium or metal ions.

Particularly good results are obtained if the zeolite utilized in the instant process is a faujasite. It is preferred if the zeolite is a faujasite with a ratio of silica to alumina from about 1 to about 80.

The metal ions are incorporated in the external and internal pore surface of the porous support. The metal ions are selected from the group consisting of transition metal ions, alkaline earth metal ions and mixtures thereof. Suitable transition metal ions for use are chosen from the group consisting of ions of zinc, copper, iron, titanium, zirconium, chromium, molybdenum, tungsten, manganese, cobalt, mercury, nickel, and mixtures thereof. Suitable alkaline earth metal ions for use are chosen from the group consisting of barium, calcium and mixtures thereof. Preferably, the metal ions utilized are transition metal ions chosen from the group consisting of copper and zinc. Even more preferably, the transition metal ions are zinc.

The incorporation of these ions can be accomplished in a number of ways including, but not limited to, ion exchange, impregnation or a combination of the two. Preferably, the metal ions are incorporated by ion exchange. Ion exchange is achieved by contacting the porous support with an aqueous solution of the metal ions to be utilized. The support is allowed to remain in contact with the metal ion solution until a substantial amount of the binding sites are loaded. The actual time necessary to load the binding sites is dependent upon the support utilized. Following the loading of the binding sites, the support may optionally be washed with water before the support is dried.

Impregnation is used in order to apply the metal ions to the support. Impregnation involves the embedding of the metal ions into the interstices of the support. With this method, the metal ions are contacted with the porous support in the presence of a liquid. The liquid and ions are normally in the form of a solution of the relevant metal compound.

There are basically two methods for impregnating which can be utilized, wet impregnation and dry impregnation. With wet impregnation, the support is placed in contact with a volume of solution containing the metal ions to be impregnated wherein the volume of the solution is more than twice the pore volume of the support material. With dry impregnation, the support is placed in contact with a volume of solution containing the metal ions to be impregnated where the volume of solution is equal to or slightly less than the pore volume of the support. Either technique is accelerated by the use of vacuum, pressure or both. Following contact, the liquid used for the metal ion application is removed from the support and thereafter the dried support is optionally calcined. Calcination is carried out with conventional calcination equipment at a temperature from about 200° C. to about 500° C.

The solution used to incorporate the metal ions preferably contains a metal ion concentration ranging from about 0.2M to about 10M, more preferably from about 1M to about 5M, regardless of the method utilized to incorporate the metal ions.

Once the metal ions have been incorporated in the porous support, the support is contacted with the aqueous media containing the soluble selenium. Maximum removal is observed in the current method when the support is placed directly after the point of origin of the selenium contamination. In petroleum refining processes, major sources of such contamination are the sour water stripper bottoms and the CPI effluent. The advantage of this placement is that since the total selenium concentration is relatively high at the point of origin, greater removal efficiency will be observed.

The selenium present in the aqueous media stream is removed by adsorption onto the support by one or more of three chemical processes. The first is ion exchange in which the selenium ion is exchanged at an ion exchangeable site of the support. The selenium species can also be removed from the media by physisorbtion or chemisorption onto the support.

The ion exchanged support utilized should preferably be in the form of a fixed bed. In a preferred embodiment of the invention, dual beds are used thereby allowing for the continuous removal of selenium with one bed while the other bed is being regenerated. The selenium containing media is contacted with the ion exchanged support at a rate from about 0.1 bed volumes per hour to about 25 bed volumes per hour, preferably from about 0.75 bed volumes per hour to about 9 bed volumes per hour, and even more preferably, about 5 bed volumes per hour. The rate of flow of the aqueous media over the support will be determined by the particular process being utilized. The size of the bed is not critical and is selected to provide reasonable run times before regeneration and is optimized on the basis of the selenium content of the stream. The temperature of the bed is from about 10° C. to about 99° C. and the exchange capacity is from about 0.1 milliequivalents/ml to about 500 milliequivalents/ml.

Following treatment of the aqueous media using the present process, the concentration of selenium found in the media is typically below about 2 ppm, even more typically below about 500 ppb. The concentration of selenium is often below about 250 ppb.

Typically, a means for monitoring the efficiency of selenium removal from the aqueous medias is utilized. Such a means serves the dual purpose of alerting those monitoring the stream of the levels of selenium being introduced into the environment as well as also providing an indication of when the support is loaded or breakthrough occurs. Preferably this means consists of hydride generation proceeded by atomic adsorption spectroscopy. An alternative means of inductively coupled mass spectroscopy may also be employed.

Since the support only has a limited number of exchange sites, it will eventually become saturated or loaded. Once the porous support is saturated with selenium ions, it can be stripped and regenerated for further use. In the preferred embodiment of the present invention, the porous support is stripped of the selenium and metal ions by washing it with an aqueous inorganic or organic acid solution. The acid is preferably chosen from the group consisting of HCl, HBr, HI, $B(OH)_3$, $HNO_3$, $H_3PO_4$, and $H_2SO_4$. Preferably, the acid chosen is HCl. The pH of the acid regeneration solution is from about 1 to about 7, preferably from about 3 to about 5. The selenium may then be treated with an oxidant in order to separate the selenium from the metal thereby allowing for effective disposal of the selenium.

Following the recovery of selenium from the porous support by use of an acid solution, the porous support can be regenerated for further use. This may be accomplished by contacting the porous support with a metal ion solution. This solution preferably contains transition metal ions, alkaline earth metal ions or mixtures thereof in a concentration ranging from about 0.2M to about 10M, more preferably from about 1M to about 5M. Once regeneration has taken place, additional aqueous media may be passed over the bed to allow for further removal of soluble selenium.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

The invention will be further described by the following Illustrative Embodiments which are provided for illustrative purposes only and are not to be construed as limiting the invention.

ILLUSTRATIVE EMBODIMENTS

Illustrative Embodiment 1

Shake Test With ZnY - A 20 g sample of NaY zeolite (LZ-Y52 powder purchased from Union Carbide) was exchanged with a 1M solution of zinc(II) nitrate (500 mls) for 1.25 hours at 60° C. and then filtered. The ion exchange process was repeated two more times. The ZnY zeolite was then washed with 550 ml water and vacuum dried overnight at 150° C.

A 250 ml sample of stripped sour water bottoms was treated with 250 mg of the ZnY zeolite and the mixture was shaken overnight. The total starting concentration of selenium in the stripped sour water bottoms was found to be 1100 ppb. The solids were then removed by filtration through a 0.45 micron filter. The total selenium concentration for the treated aqueous sample was found to be 200 ppb.

Illustrative Embodiment 2

Shake Test With CuY - A 60 g sample of NaY zeolite (LZ-Y52 powder purchased from Union Carbide) was exchanged with a 2M solution (600 ml) of copper nitrate at 60° C. for 2 hours. The CuY zeolite was then washed twice with 150 ml of water before being vacuum dried overnight at 150° C.

A 138 mg sample of the CuY zeolite was added to a 250 ml sample of stripped sour water bottoms. The total starting concentration of selenium in the stripped sour water bottoms was 1060 ppb. The mixture was shaken for 1.5 hours and then filtered through a 0.2 micron filter. The total selenium concentration for the treated aqueous sample was found to be 48 ppb.

Illustrative Embodiment 3

Shake Test with Cu/ZnY - A 65.3 g sample of NaY zeolite (LZ-Y52 powder purchased from Union Carbide) was impregnated by mixing the NaY zeolite with a 20 ml aqueous solution containing 19.75 g of $Cu(NO_3)_2.2.5 (H_2O)$ for 15 minutes at room temperature. The zeolite was then vacuum dried overnight at 150° C.

A 30.06 g portion of the above impregnated zeolite was further impregnated by mixing it with a 15 ml aqueous solution containing 12.26 g of zinc nitrate hydrate. The Cu/ZnY zeolite was then vacuum dried overnight at 150° C.

A 136 mg sample of the above Cu/ZnY zeolite was added to a 250 ml sample of stripped sour water bottoms. The total concentration of selenium in the stripped sour water bottoms was 1060 ppb. The mixture was shaken for 1.5 hours and then filtered through a 0.2 micron filter. The total selenium concentration for the treated sample was less than 10 ppb.

Illustrative Embodiment 4

Shake Test of Zn/Fe/NaY - A 200.64 g sample of NaY zeolite (LZ-Y52 powder purchased from Union Carbide) was impregnated by mixing the zeolite with a 65 ml aqueous solution containing 23.88 g of iron(III) nitrate for 15 minutes at room temperature. The zeolite was then vacuum dried overnight at 150° C. A 100.14 g sample of the above impregnated zeolite was further impregnated by mixing the zeolite with a 25 ml solution containing 16.37 g of zinc nitrate hydrate for 15 minutes at room temperature. The zeolite was then vacuum dried overnight at 150° C. before being slowly heated to 550° C.

A 139 mg sample of the Zn/Fe/NaY zeolite was added to a 250 ml sample of stripped sour water bottoms. The sample of stripped sour water bottoms contained a total selenium concentration of 1060 ppb. The mixture was shaken for 1.5 hours before being filtered through a 0.2 micron filter. After treatment, less than 48 ppb selenium remained.

Illustrative Embodiment 5

Column Studies on CaY - A 14.56 g sample of NaY zeolite (40-20 mesh LZ-Y52) was exchanged with a 1.5M solution of calcium nitrate (200 ml) at room temperature for 4 hours. The ion exchange process was repeated an additional four times. The CaY zeolite was then washed with 400 ml of deionized water. A 14.6 mg sample of the CaY zeolite was then placed in a column to give a fixed bed of dimensions 1.5 cm diameter×11 cm. A 300 ml sample of stripped sour water bottoms with a total selenium concentration of 1268 ppb was passed over the bed. The eluent was analyzed and found to contain a total selenium concentration of 228 ppb. The column was then eluted with 300 ml stripped sour water bottoms. The eluent contained a total selenium concentration of 571 ppb.

Illustrative Embodiment 6

Column Studies with ZnY - A 100 g sample of NaY zeolite (LZ-Y52 ⅛ inch extrudate) was contacted with a 900 ml aqueous solution containing 76 g of zinc(II) nitrate at room temperature for 12 hours. The ion exchange process was repeated three more times. The ZnY zeolite was then washed three times with 300 ml portions of deionized water and dried at 100° C. for 12 hours. The dried extrudate was then sieved to 40-20 mesh.

(A) A 12.03 g sample of the 40-20 mesh ZnY zeolite was loaded into a column to give a fixed bed of dimensions 1.5 cm diameter×9.6 cm. A 300 ml sample of stripped sour water bottoms with a total selenium concentration of 1268 ppb was passed over the bed. The eluent was analyzed and found to contain a selenium concentration of less than 10 ppb. The column was then eluted with 300 ml stripped sour water bottoms and the eluent contained a total selenium concentration of less than 10 ppb.

(B) A 31.4 g portion of the sieved material was then loaded into 17 cm×1.73 cm column to give a total bed volume of 40 ml. A sample of stripped sour water bottom media containing 1440 ppb total selenium was passed over the bed at a rate of 4.5 bed volumes per hour or 3 ml/min. A 250 ml sample was collected after 115.8 bed volumes. The sample was shown to contain 256 ppb selenium. After 154 bed volumes, a second 250 ml sample was collected and contained 869 ppb selenium. After 256 bed volumes, a third sample was collected and contained 1485 ppb selenium. The last sample was collected after 309 bed volumes and contained 1409 ppb selenium.

What is claimed is:

1. A process for removing soluble selenium from an aqueous media which comprises contacting the aqueous media with a zeolite having incorporated therein metal ions selected from the group consisting of transition metal ions, alkaline earth metal ions, and mixtures thereof.

2. The process of claim 1 wherein the selenium is in the form of selenide.

3. The process of claim 1 wherein the metal ions are alkaline earth metal ions.

4. The process of claim 3 wherein the alkaline earth metal ions are selected from the group consisting of barium, calcium, and mixtures thereof.

5. The process of claim 4 wherein the zeolite is a faujasite having a silica to alumina ratio ranging from about 1 to about 80.

6. The process of claim 1 which further comprises regenerating the zeolite for further use by:
   a. stripping the selenium from the zeolite by washing the zeolite with an acid solution effective for the removal of selenium from the zeolite; and
   b. flushing the zeolite with a metal ion solution.

7. The process of claim 6 wherein the acid solution is chosen from the group consisting of HCl, HNO$_3$, HBr, HI, B(OH)$_3$, H$_3$PO$_4$ and H$_2$SO$_4$.

8. The process of claim 1 wherein the zeolite is used to remove selenium from hydrocracking sour waste streams and is located directly after the source of the sour waste streams.

9. The process of claim 1 wherein the metal ions are transition metal ions.

10. The process of claim 9 wherein the transition metal ions are selected from the group consisting of zinc, copper, iron, and mixtures thereof.

11. The process of claim 9 wherein the transition metal ions are selected from the group consisting of zinc, copper, iron, titanium, zirconium, chromium, molybdenum, tungsten, manganese, cobalt, mercury, nickel, and mixtures thereof.

12. The process of claim 11 wherein the zeolite is a faujasite having a silica to alumina ratio ranging from about 1 to about 80.

13. The process of claim 11 wherein the transition metal ions are zinc ions.

14. The process of claim 11 wherein the transition metal ions are copper ions.

15. A process for removing soluble selenium from an aqueous media which comprises:
   a. contacting an aqueous media with a metal ion incorporated zeolite wherein the metal ions are selected from the group consisting of zinc, copper, iron, calcium, titanium, zirconium, chromium, molybdenum, tungsten, manganese, cobalt, mercury, nickel, barium and mixtures thereof;

b. monitoring the efficiency of the selenium removal;

c. stripping the selenium from the metal ion incorporated zeolite with an acid solution once the monitoring indicates the zeolite is loaded;

d. regenerating the metal ion incorporated zeolite by flushing it with a metal ion solution; and e. contacting the regenerated metal ion incorporated zeolite with more selenium-containing media.

16. The process of claim 15 wherein the zeolite is a faujasite having a silica to alumina ratio ranging from about 1 to about 80.

17. The process of claim 15 wherein the metal ions are zinc ions.

18. The process of claim 15 wherein the metal ions are copper ions.

19. The process of claim 15 wherein the means for monitoring include hydride generation proceeded by atomic adsorption spectroscopy.

20. The process of claim 15 wherein the acid solution is chosen from the group consisting of HCl, $HNO_3$, HBr, HI, $B(OH)_3$, $H_3PO_4$ and $H_2SO_4$.

21. A process for removing soluble selenium from an aqueous media which comprises:

a. contacting an aqueous media with a zinc ion incorporated faujasite having a silica to alumina ratio from about 1 to about 80;

b. monitoring the efficiency of the selenium removal;

c. stripping the selenide complex from the zinc ion incorporated faujasite with HCl once the monitoring indicates the zinc ion incorporated faujasite is loaded;

d. regenerating the zinc ion incorporated faujasite by flushing it with a zinc ion solution; and e. contacting the zinc ion exchanged faujasite with more selenium-containing media.

* * * * *